March 9, 1943.   V. PUC   2,313,579
SLIDING CLASP FASTENER
Filed May 15, 1940
FIG.1.
FIG.2.
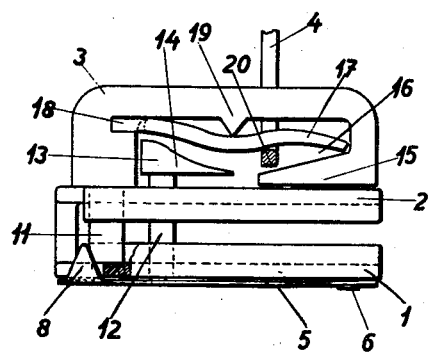
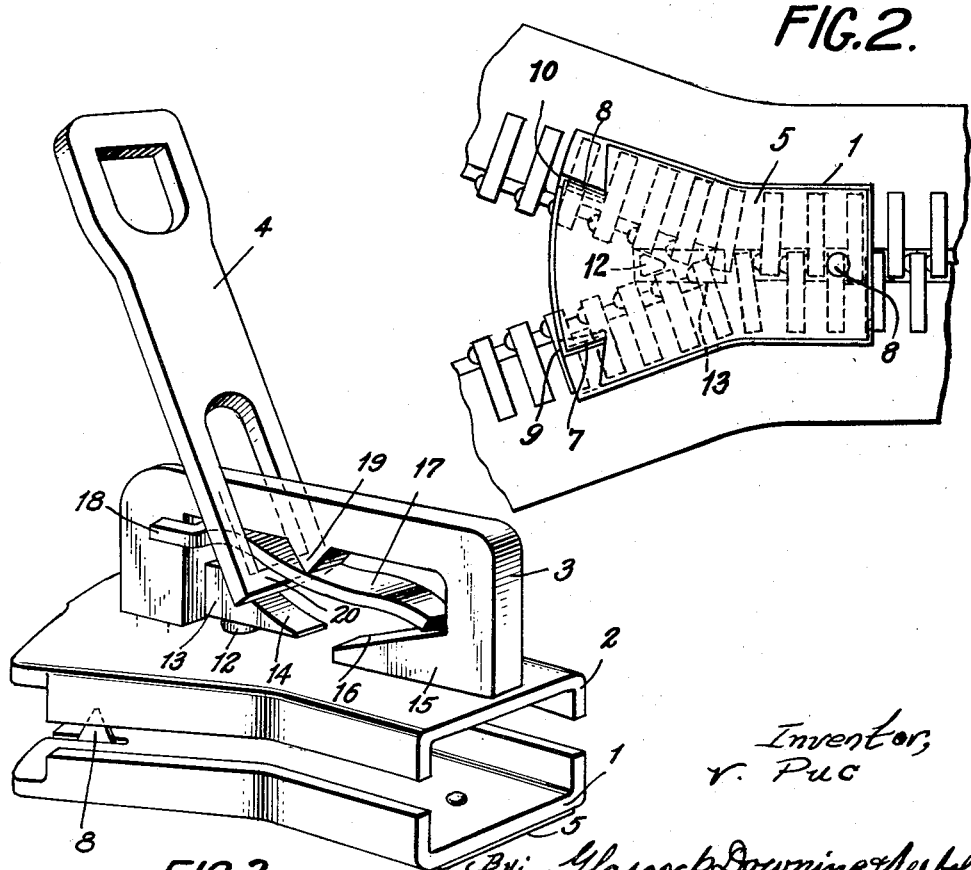
FIG.3.
Inventor,
V. Puc
By: Glascock Downing & Seibold
Attys.

Patented Mar. 9, 1943

2,313,579

UNITED STATES PATENT OFFICE 2,313,579

SLIDING CLASP FASTENER

Vojtěch Puc, Prague, Czechoslovakia; vested in the Alien Property Custodian

Application May 15, 1940, Serial No. 335,344
In Czechoslovakia May 18, 1938

9 Claims. (Cl. 24—205.5)

This invention relates to a sliding member for sliding clasp fasteners with automatic locking means, in which the defects of the known constructions, which consist in an imperfect holding of the sliding member on the fastener bands in the set position and in the danger of the fastener elements being damaged through small lift of the locking means, are overcome by this, that the locking member is made in the form of a flat leaf spring which is arranged at the lower surface of the sliding member and is provided at one end with an upwardly projecting tooth which extends into the gaps between the fastener elements of the two bands of the sliding clasp fastener, the said spring being, for the purpose of releasing the locking action, actuated by a pin which extends through the top and bottom plates of the sliding member and is displaced by a supporting lever which is loosely supported in a recess of the bow part of the sliding member and is capable of being rocked, on the grip being pulled, in one direction or the other in the manner of a scale beam.

The leaf spring preferably has a shape corresponding to the contour of the sliding member and the locking teeth are arranged at its broader end at the emerging end of the sliding member, so that they penetrate into the gaps between the fastener elements of the two fastener bands into their separated part. The movable pin is rigidly connected to the leaf spring and also acts as the wedge for separating the fastener elements. The supporting lever in the recess of the bow part of the sliding member coacts with the top profiled head of the pin, a fixed inclined guide being provided opposite the said head at the opposite end of the bow part for the lower transverse part of the grip of the sliding member to slide on. This transverse part penetrates, on the grip being moved in one direction or the other, into the wedge-shaped gaps between the end of the supporting lever and the head of the pin or the said guide and produces a swinging motion of the lever which forces the pin downwards against the pressure of the leaf spring and forces the locking teeth out of engagement with the fastener bands.

The further features of the construction of the sliding member according to the invention will be gathered from the constructional example shown in the accompanying drawing. In the drawing:

Figure 1 is a side elevation,

Figure 2 a view from below of the sliding member according to the invention, and Figure 3 is a perspective detail view showing particularly the construction of the forked element.

The sliding member consists in the usual way of the lower plate 1, the upper plate 2 and the rigid bow part 3 for fixing the grip 4 the bow-part 3 being shaped to form an elongated recess between the under surface of the bow part and the plate 2. The locking member consists of a flat leaf spring 5 which is arranged at the lower surface of the lower plate 1 of the sliding member and corresponds in shape approximately to the contour of this lower plate.

The narrow end of the leaf spring 5 is fixed by means of a rivet 6 to the plate 1, whilst its broader end is provided with two upwardly bent teeth 7, 8, which extend through corresponding slots 9, 10 in the marginal part at the end of the plate 1 of the sliding member. These teeth are preferably formed by incising and bending up the corner parts of the leaf spring, which are indicated in broken lines in Figure 2. In the vicinity of the rivet 11 of the sliding member, which forms a continuation of the bow part 3 between the upper and lower plate, there is provided on the leaf spring 5 an upwardly extending pin 12 which extends with clearance through the two plates and into the recess of the bow part. This pin is of wedge-shaped cross-section and also acts as the wedge for separating the fastener elements or for opening the fastener. The pin terminates at the top in a head 13 which has an inclined surface 14, as shown in Figure 1. The forward end of the bow part 3 is provided with an elongated, inwardly directed shoe 15, the upper surface 16 of which is also formed as an inclined surface. In the upper part of the recess of the bow part is loosely mounted the supporting lever 17 which is guided with its rearward forked end 18 on the vertical arm of the bow part, whilst with its forward, slightly upwardly bent end it rests on the shoe 15. Approximately in the middle of its length this lever has a downward bend and merges in a curved manner into the forward and rearward end. Opposite the downwardly bent part of the lever 17 the lower surface of the upper transverse portion of the bow part is provided with a bearing projection 19, about which the lever can rock both ways in the manner of a scale beam. The width of the lever 17 corresponds substantially to the width of the bow part, with the exception of the rearward forked end 18 which, as will be seen, must be of greater width, so that the lever at this place forms two lateral projections extending beyond the contour of the bow part. The grip 4 is hung with its opening in the bow part, the width of the opening corresponding to that of the bow part and the lower transverse part 20 of the grip always being under the supporting lever.

It will be obvious that the leaf spring 5, when in the position shown in Figure 1, will always press the locking teeth 7, 8 into the gaps between the fastener elements at the two fastener bands, namely, into those parts which have already left the sliding member. When the lock is to be released and the sliding member is to be displaced, for instance to the right in Figure 1, the grip 4 is pulled in this direction, the lower transverse part 20 of the grip penetrates between the wedge-shaped ascending surface 16 of the bow part and the front end of the lever 17, which lever bears against the support 19 and rocks about the said support, its rearward end resting on the head 13 of the pin 12, forcing the pin downwards and, by bending the leaf spring 5 about the fixed end, withdraws the locking teeth 7, 8 out of engagement with the fastener band. On the grip being further pulled in the said direction, the sliding member can slide loosely over the elements of the bands without the elements being damaged by the locking teeth. When the sliding member is to be moved in the opposite direction, the grip 4 is swung over to the left, its lower transverse part 20 passes into the wedge-shaped space between the inclined surface 14 of the locking pin head and the rearward end of the supporting lever 17, whereby the pin is again forced downwards and the teeth 8, 9 come out of engagement with the fastener bands. The forcing downwards of the pin is ensured through the side arms of the grip, on the grip being laid over for the purpose of displacing the sliding member in the said direction, coming against the laterally extending projections of the rearward, forked end 18 of the lever 17, so that the lever will again rock about the support 19 and will, with its rearward end, force the pin 12 downwards as long as a pull is exerted on the grip.

It will be obvious that the invention may be modified in various ways as regards its constructional details, without departing from its essential features.

I claim:

1. A slider for a slide fastener of the type which includes a pair of stringers having rows of spaced interlocking elements along their longitudinal edges, comprising an upper plate and a lower plate spaced to receive the interlocking elements of the stringers, a leaf spring secured to the lower plate and arranged at the lower surface thereof, locking teeth united with the spring and extending upwardly into the space between the plates to engage said interlocking elements, an upwardly and downwardly movable pin extending through the plates and engaging the spring for forcing said teeth downwardly when the pin is depressed, a fixed bow member arranged on the upper plate and forming an elongated recess, a head fixed to the upper end of the pin, said head and a portion of the bow being provided with oppositely inclined cam surfaces, a lever arranged in the recess above said cam surfaces and rockable about a horizontal axis arranged about midway the length of the lever, and a pull member having a portion extending beneath the lever and slidable lengthwise thereof and engageable with either of said cam surfaces whereby when the pull member is pulled in one direction said portion thereof will be wedged between the cam surface of the bow and one end of the lever to rock the latter and cause the other end of the lever to engage and depress the head and the pin, and when pulled in the opposite direction will wedge between the last-mentioned end of the lever and the cam surface of the head to depress the pin.

2. A slider as claimed in claim 1, in which the pin is arranged in the vicinity of the center of the plates.

3. A slider as claimed in claim 1, in which one end of the lower plate is provided with vertical slots through which the locking teeth extend.

4. A slider as claimed in claim 1, in which the lever is bifurcated at one end to receive a portion of one end of the bow.

5. A slider as claimed in claim 1, in which the bow has a depending protuberance about midway the ends thereof engaging the upper surface of the medial portion of the lever.

6. A slider claimed in claim 1, in which the lower surface of the medial portion of the lever bulges downwardly.

7. A slider as claimed in claim 1, in which the pin is of wedge shape in horizontal cross section.

8. A slider for a slide fastener of the type which includes a pair of stringers having rows of spaced interlocked elements along their longitudinal edges, comprising an upper plate and a lower plate spaced to receive the interlocking elements of the stringers, connecting means connecting the plates together at one end of the slider, a leaf spring arranged below the lower plate and secured to the opposite end of the slider, locking teeth united with the spring and extending upwardly through the lower plate into the space between the plates to engage said interlocking elements, a vertical pin having its lower end fixed to the spring adjacent to said locking teeth, said pin being movable upwardly and downwardly and extending through the plates, a bow fixedly arranged at the top of the upper plate and forming an elongated recess, a lever loosely arranged in the recess and having one of its ends slidably interlocked with one end of the bow, a head arranged in the recess and fixed to the upper end of the pin, said bow and head having downwardly converging inclined surfaces arranged below the lever, and a pull member having a portion slidable along the undersurface of the lever and adapted to engage either of said inclined surfaces for rocking the lever when pulled in one direction to cause the lever to depress the pin, and for directly depressing the pin when pulled in the opposite direction.

9. A slider for a slide fastener of the type which includes a pair of stringers having rows of spaced interlocking elements along their longitudinal elements, comprising an upper plate and a lower plate spaced to receive the interlocking elements of the stringers, upwardly and downwardly movable locking teeth projecting into said space, resilient means secured to the slider and arranged below the base plate and operatively connected with the teeth for yieldingly holding them in uppermost position, an upwardly and downwardly movable pin extending through the upper plate and operatively connected with the locking teeth for forcing the teeth downwardly when the pin is depressed, a fixed bow member arranged on the upper plate and forming an elongated recess, a head fixed to the upper end of the pin, said head and a portion of the bow being provided with oppositely inclined cam surfaces, a lever arranged in the recess above said cam surfaces and rockable about a horizontal axis arranged about midway the length of the lever, and a pull member having a portion extending beneath the lever and slidable lengthwise thereof and engageable with either of said cam surfaces whereby when the pull member is pulled in one direction said portion thereof will be wedged between the cam surface of the bow and one end of the lever to rock the latter and cause the other end of the lever to engage and depress the head and the pin, and when pulled in the opposite direction will wedge between the last-mentioned end of the lever and the cam surface of the head to depress the pin.

VOJTĚCH PUC.